United States Patent Office 3,441,287
Patented Apr. 29, 1969

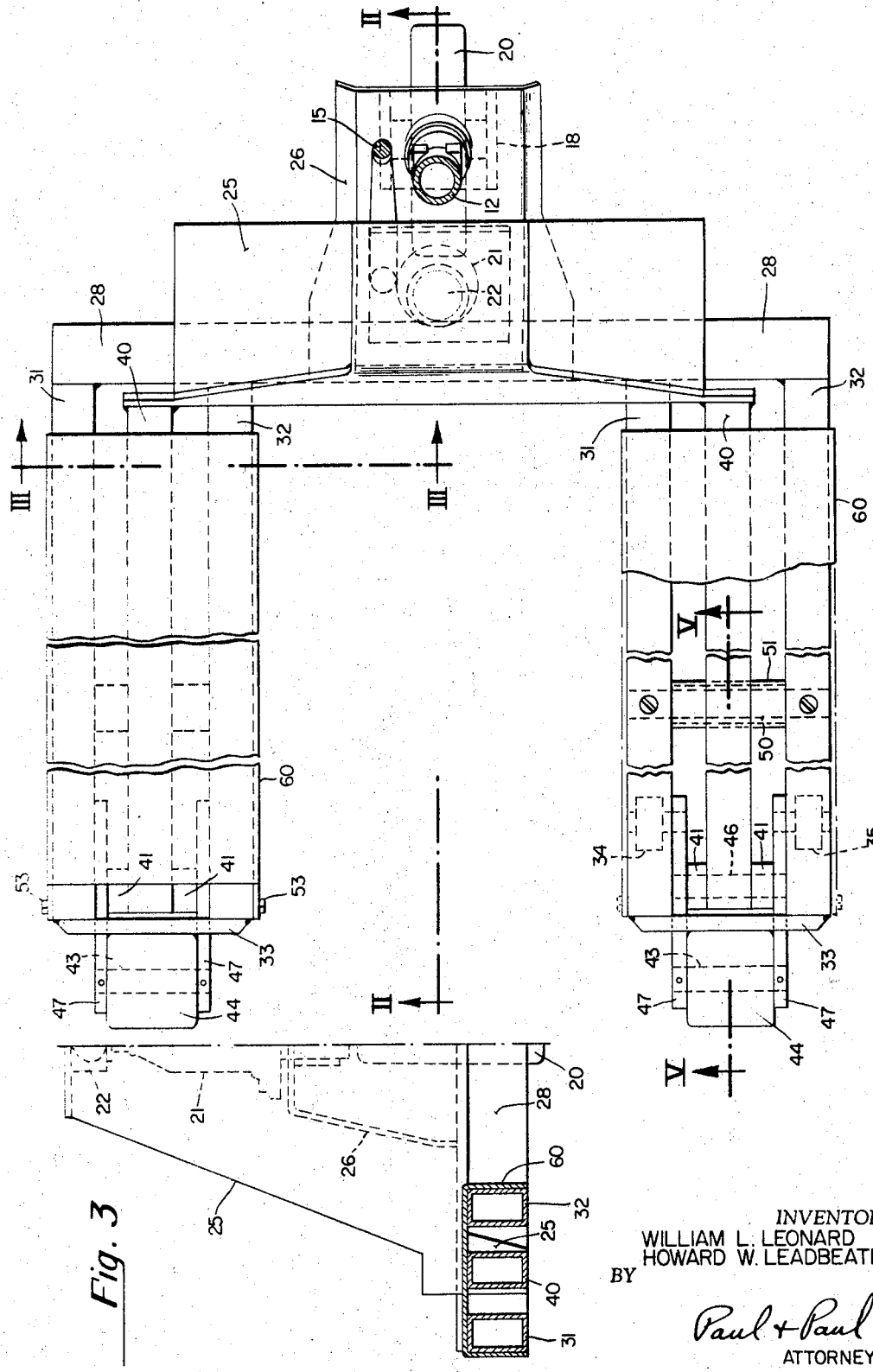

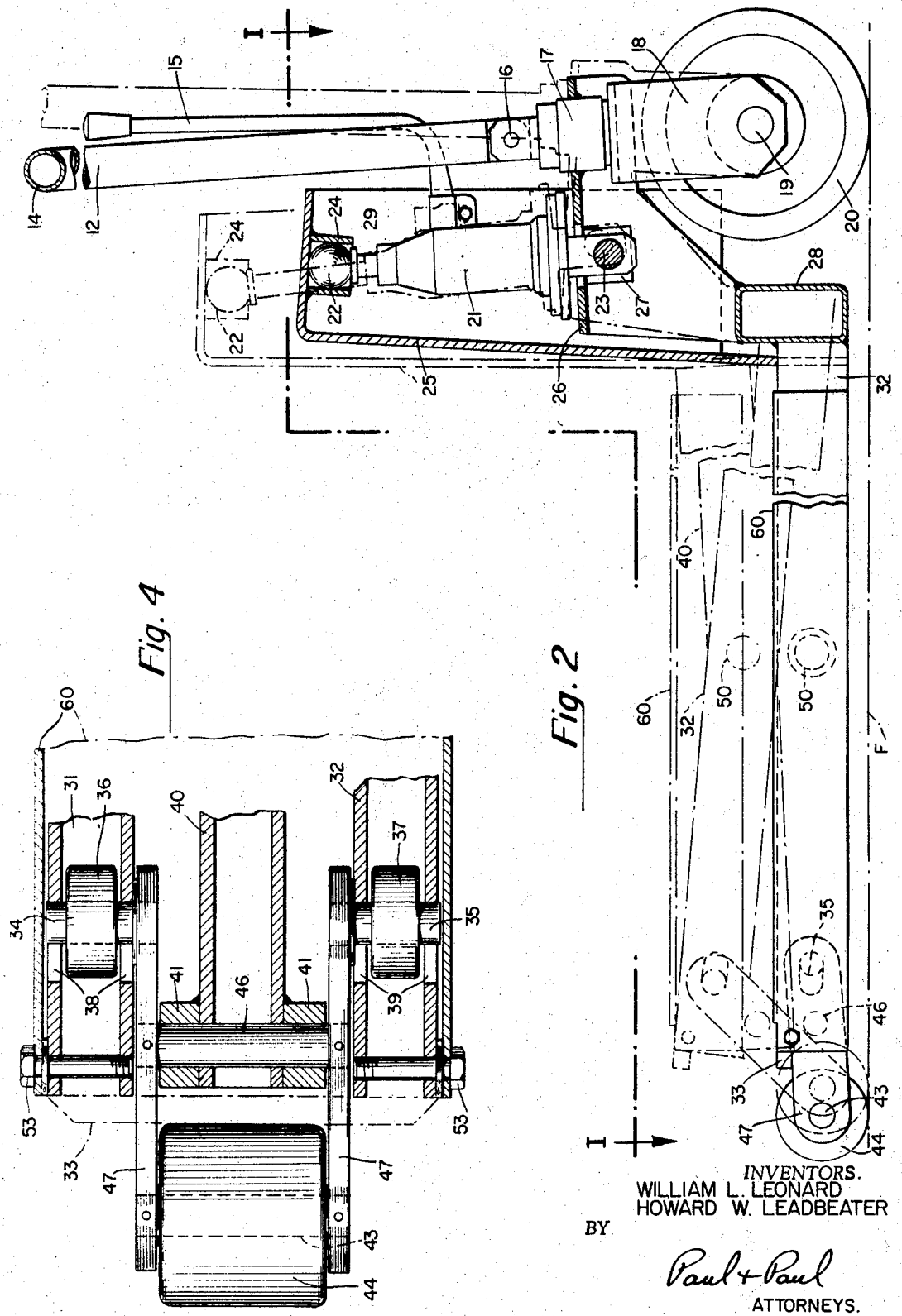

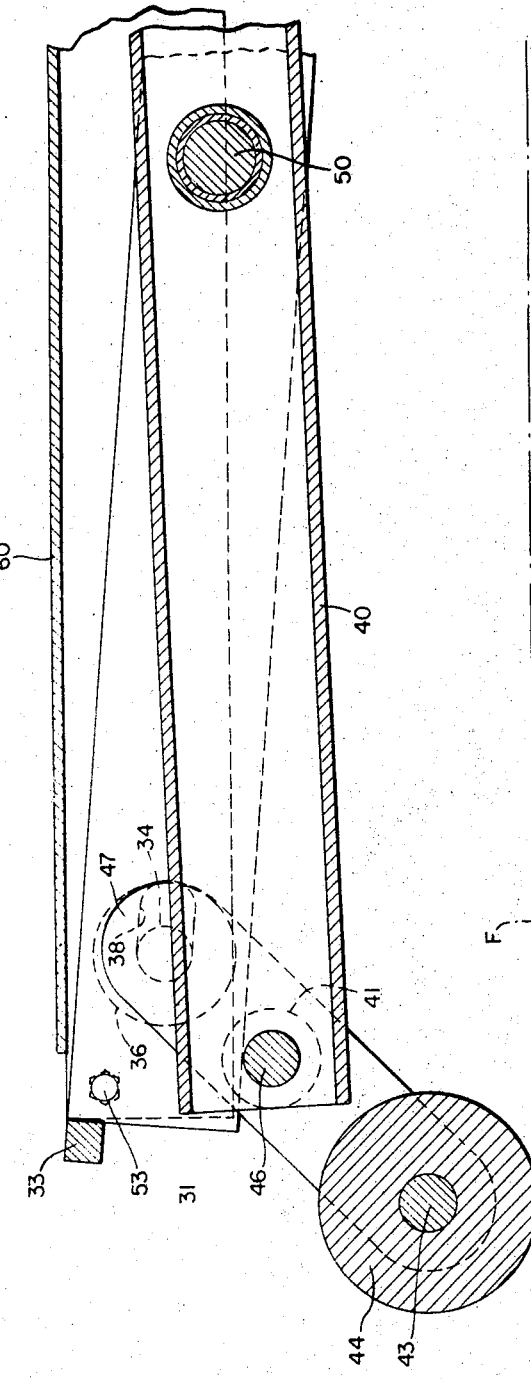
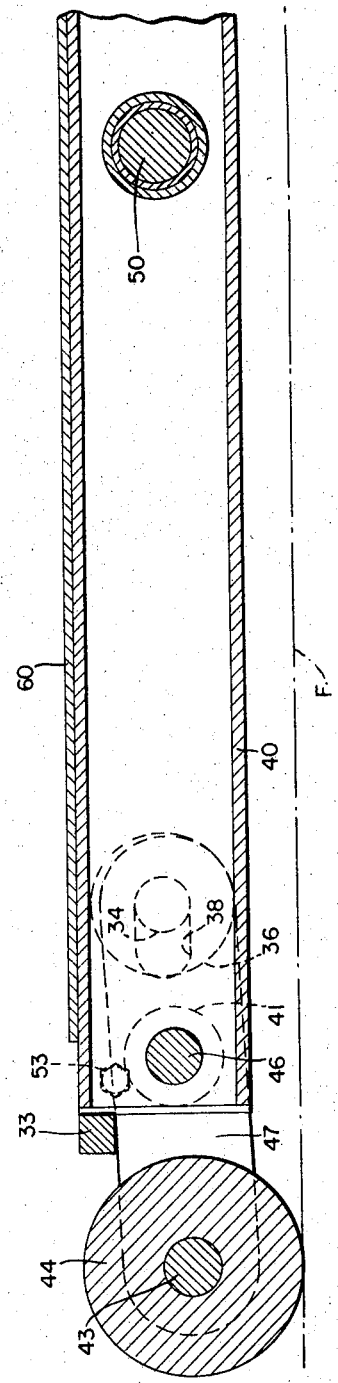
INVENTORS.
WILLIAM L. LEONARD
HOWARD W. LEADBEATER
BY Paul & Paul
ATTORNEYS.

1

3,441,287
PALLET LOAD-LIFT TRUCK
William L. Leonard, Narberth, and Howard W. Leadbeater, Glenside, Pa., assignors, by mesne assignments, to Universal American Corporation, a corporation of Delaware
Filed July 6, 1967, Ser. No. 651,600
Int. Cl. B62b 1/04
U.S. Cl. 280—43.12                                    6 Claims

ABSTRACT OF THE DISCLOSURE

An industrial pallet load-lift truck is disclosed in which the forks include two outer and one inner lever member pivotal about a common pivot shaft to provide a scissors action. Separate pivotal links having floor-engaging wheels at one end interconnect the fore ends of the outer and inner lever members of the forks for lifting the fore end of the pallet load and for supporting and stabilizing the fore ends of the lever members. These fore-end links are pivoted into load-lifting position by the outer and inner lever members of the fork in response to the scissors motion. No separate or additional linkage is used to connect the fore-end load lifting links to the operating or rearward end of the load-lift vehicle.

BACKGROUND OF THE INVENTION

Field of the invention

This invention relates to industrial trucks and particularly to pallet load-lift trucks.

Description of the prior art

The prior art patent to Nichols, 3,170,706, shows an industrial truck the forks of which are provided with lever arms pivoted about an intermediate pivot point to provide a scissors action.

The prior art patents to Klumb et al., 2,372,585, and to Framhein, 2,422,538, show industrial lift trucks in which the forks are provided with pivotal links at their fore ends which move wheels into load-lifting position, but such action is controlled by separate linkage which extends forwardly from the rearward or operating end of the truck.

SUMMARY OF THE INVENTION

The present invention discloses an improved load-lift pallet truck which combines in a single assembly a load-lifting fork scissors action and a front-end load-lifting and scissors support mechanism. The front-end load-lifting and scissors support mechanism is actuated solely by the scissors mechanism itself, without any additional connecting linkage between the fore and rearward or control end of the vehicle.

BRIEF DESCRIPTION OF THE DRAWINGS

FIG. 1 is a plan view of a load-lift pallet truck according to the present invention as seen looking along the line I—I of FIG. 2;

FIG. 2 is a side elevational view of the load-lift pallet truck of FIG. 1, as seen looking along the line II—II of FIG. 1;

FIG. 3 is a front elevational view of a portion of the load-lift truck, looking along the line III—III of FIG. 1;

FIG. 4 is an enlarged view, in section, of the front end of one of the forks showing the fore-end load-lifting and support mechanism;

FIG. 5 is an elevational view, in section, of the forward end portion of one of the forks as seen along the line V—V of FIG. 1. In FIG. 5, the load-lifting and support mechanism is in its lowered position;

FIG. 6 is a view similar to FIG. 5 but showing the forward end of the fork after the fore-end load-lifting and support mechanism has been actuated, by the scissors action of the fork, into the load-lift position.

DESCRIPTION OF THE PREFERRED EMBODIMENT

Referring now to the drawings, FIGS. 1 and 2 show a plan and side elevational view, respectively, of a load-lift pallet truck embodying the present invention. The novelty resides in the construction of the forks and this part of the pallet truck will be described in detail. The remainder of the truck is of known construction and need be but briefly described. In the description, the operator end of the pallet truck will be considered to be the rearward end, and the forks will be considered as extending forwardly therefrom.

In FIGS. 1 and 2, the pallet truck is shown to have at its operator or rearward end a floor-engaging pivot wheel 20 mounted for rotation on an axle 19 supported in a yoke 18 which is part of the steering pivot assembly. The floor is indicated by the reference character F. Mounted on yoke 18 is a pivot tube 17 having therein a steering pivot 16, and extending upwardly from the steering pivot 16 is a tubular steering handle 12 having at its upper end a cross tube or handle 14.

Pivot tube 17 supports a frame 26 to the lower end of which is welded (or otherwise secured) a cross tube 28, and to the forward surface of cross tube 28, at each end therof, is welded (or otherwise secured) a pair of forward-extending tubular members 31 and 32 which comprise what will be referred to as the outer fork members since they are located on each side of an inner fork member 40. And, since frame 26 supports the outer fork members 31, 32, frame 26 will be referred to as the outer fork assembly frame.

Each of the two forks is of identical construction, and accordingly, it will be necessary to describe but one of them. Also, like reference numbers have been assigned to like parts of each fork.

At their forward ends, the tubular outer members 31 and 32 of the fork are tied together by a tie bar 33. The fork assembly, including the outer members 31, 32 and the inner member 40, is provided with a cover 60 which is pivotal at the forward end about the bolts 53.

Supported just below the upper surface of the outer fork frame 26, as by a bearing 27, is a pivot pin 23 on which a hydraulic jack 21 is pivotally mounted. The jack 21 is controlled by a control handle 15. Extendable upwardly from the upper end of jack 21 is its piston 29 the head of which bears against the ball 22 of a ball and socket joint 24. Supported on the ball and socket 24 is a frame 25 to the lower end of which the inner tubular members 40 of the forks are welded or otherwise secured. Thus, frame 25 will be referred to as the inner fork assembly frame.

The inner fork member 40 and the outer fork members 31 and 32 are connected by a common pivot shaft 50, which may preferably be located forwardly of the midpoint of the fork members. For example, the fork pivot shaft 50 may be located rearwardly of the front end of the forks, approximately two-fifths of the full length of the fork members.

As seen in the detail showing of FIG. 4, secured as by welding to the fore end of the inner fork member 40 is a bearing boss 41 which supports a shaft 46 which functions as a link pivot and wheel shaft. The pivot shaft 46 supports, at its two ends, the link fork 47, and at the forward end of the link fork 47 is a cross shaft 43 which is the axle of the floor-engaging front wheel 44.

The rearward end portion of the link fork 47 engages and carries one end of each of the shafts 34 and 35 which are mounted in the outer fork members 31 and 32 and which serve as the axles of the rollers 36 and 37 carried within the tubular outer fork members 31 and 32. The axles or shafts 34 and 35 are supported in the members 31 and 32 in elongated holes or slots 38 and 39.

In operation, with the forks in their lowered position, which is the position shown in FIG. 5 and indicated in solid lines in FIG. 2, the operator pushes the truck forwardly so that the forks enter into the opening of the pallet. When the forks are properly inserted, the operator operates the hydraulic-jack control handle 15 to cause the piston 29 of the jack to push upwardly against the ball and socket 24 to lift the inner fork assembly frame 25 and to exert a downward reaction thrust on the outer fork assembly frame 26. As a result, the rearward ends of the inner fork members 40 are lifted above the rearward ends of the outer fork members 31 and 32, the latter being maintained in their lowermost position.

Since all three members 31, 32 and 40 of each fork assembly are mounted on the pivot shaft 50, it will be seen that when the rearward end of the inner fork member 40 is lifted, from the solid line position in FIG. 2 to the dot-and-dash line position, the pivot shaft 50 is also lifted from the solid line to the dot-and-dash line position shown in FIG. 2. This lifts the forward ends of the outer fork members 31 and 32 from the solid line to the dot-and-dash line position shown in FIG. 2. This change in elevation at the forward end of the fork is also shown in FIG. 6.

When the forward ends of the outer fork members 31 and 32 rise, they carry upwardly the rollers 36 and 37 and this elevates the rearward end of the link fork 47, causing the link fork 47 to pivot about the shaft 46, and causing the front wheel 44 to move downwardly and rearwardly. This causes an upward thrust on the pivot shaft 46 and, as a result, the forward end of the inner fork member 40 is forced upwardly, rising from the DOWN position shown in FIG. 5 to the UP position shown in FIG. 6. This lifts the fork pivot shaft 50 further. The slots 38 and 39 in the outer fork members 31 and 32 allow the rollers 36 and 37 to move forwardly relative to the fork members 31, 32 as the link fork 47 pivots about the axis of the shaft 46. As a result of this forward movement, the rollers 36 and 37 move to the forward end of the slots 38 and 39, as indicated in dot-and-dash lines in FIGS. 2 and 6.

The construction is such that the cover 60 of the forks remains substantially level during the load-lifting operation. In the absence of the fore-end link mechanism and its pivotal action about the link pivot shaft 46, the cover 60 would be lower at the forward end, due to the fact that the fork or scissors pivot 50 is forward of the center of the fork lever arms. The link mechanism lifts the inner fork member 40 sufficiently to raise additionally the outer fork members 31 and 32, and the cover 60 is maintained substantially level.

In addition to providing the lifting action just described, the link fork 47 also provides a stabilizing or supporting connection between the inner and outer fork members at their forward ends.

What is claimed is:
1. In a load-lift truck having a body portion and a load-lift portion projecting forwardly from said body portion and adapted for insertion into the opening of a pallet,
 (a) a scissors assembly comprising crossed lever arms in said load-lift portion,
 (b) said crossed lever arms including an inner lever arm, a pair of outer lever arms, and a common pivot shaft on which said inner and outer lever arms are pivotally mounted,
 (c) means in said body portion for lifting the rearward end of one of said lever arms while applying a downward thrust against the rearward end of the other, to pivot said one lever arm about its forward end and to lift the common pivot shaft, thereby to lift the forward end of the other lever arm,
 (d) auxiliary link means connected between the forward ends of said one and other lever arms,
 (e) said auxiliary link means including an auxiliary pivot shaft at the forward end of said one lever arm on which said auxiliary link means is pivotally mounted at a point intermediate its two ends,
 (f) the rearward end of said auxiliary link means being pivotal about the forward end of said other lever arms,
 (g) the forward end of said auxiliary link means carrying a floor-engaging wheel,
 (h) whereby when the forward end of said other lever arm is lifted by the scissors action, the floor-engaging wheel applies a downwardly thrust to lift the auxiliary pivot shaft, thereby to lift the forward end of said one lever arm and to lift further the forward end of said other lever arm.

2. Apparatus according to claim 1 characterized in that said one lever arm is the inner arm and said other lever arm is the pair of outer lever arms.

3. Apparatus according to claim 2 further characterized in that said load-lift portion includes a cover, and in that the scissors action of said crossed inner and outer lever arms in combination with the action of said auxiliary link means effects lifting of said cover while maintaining said cover substantially level.

4. A load-lift pallet truck having a body portion and a pair of forwardly extending forks,
 (a) each fork including a scissors assembly having an inner lever arm, a pair of outer lever arms and a common pivot shaft,
 (b) means for spreading apart the rearward ends of said inner and outer lever arms to separate the forward ends thereof,
 (c) an auxiliary link pivotally connecting the forward ends of said inner and outer lever arms, and
 (d) a floor-engaging roller mounted at the forward end of said auxiliary link for lifting the forward ends of both said inner and outer lever arms relative to the floor when said lever arms of said scissors assembly are spread.

5. A load-lift pallet truck as claimed in claim 4 characterized in that the means for spreading apart the rearward ends of said scissors lever arms comprise means for lifting the inner lever arm relative to the outer thereby to lift the forward end of the outer lever arm relative to the inner.

6. A load-lift pallet truck as claimed in claim 5 further characterized in that each of said forwardly extending forks is provided with a load-lift cover plate, in that the common pivot shaft of the scissors assembly is forward of the mid-point of the lever arms, and in that said auxiliary link is so pivotally connected that when the forward ends of said arms are separated by the scissors action the floor-engaging roller lifts the forward ends of both the inner and outer arms relative to the floor by an amount just sufficient to maintain the load-lift cover plate substantially level.

References Cited

UNITED STATES PATENTS

| | | | |
|---|---|---|---|
| 575,390 | 1/1897 | Burnett | 280—43.12 |
| 1,129,775 | 2/1915 | Anthony | 280—43.12 |
| 3,290,051 | 12/1966 | O'Brien et al. | 280—43.12 |
| 3,352,569 | 11/1967 | Goodacre | 280—43.12 |

BENJAMIN HERSH, *Primary Examiner.*

JOEL E. SIEGEL, *Assistant Examiner.*